Figure 1:
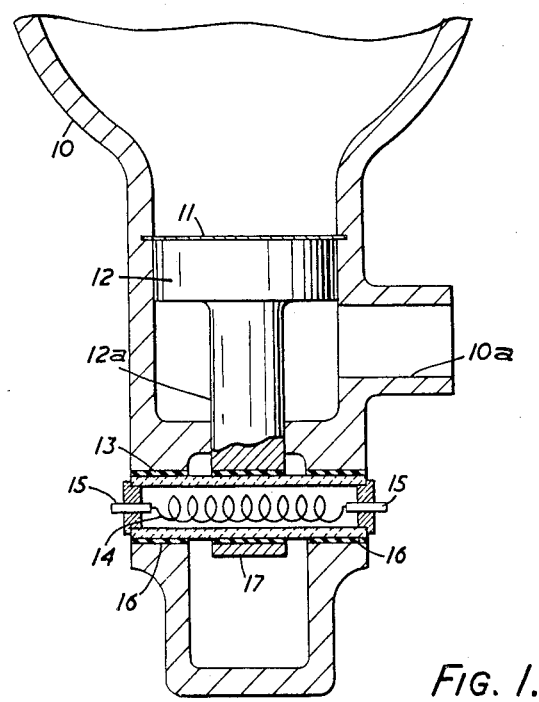

INVENTORS
RONALD HIRST & M. J. THORNTON
BY
Mason, Mason & Albright
ATTORNEY

United States Patent Office 3,209,937
Patented Oct. 5, 1965

3,209,937
ELECTRICAL ACTUATOR FOR OPENING THE OUTLET OF A PRESSURE VESSEL
Ronald Hirst, George Green, near Slough, England; and Michael John Thornton, Cheltenham, England, assignors of one-half to Graviner Manufacturing Company Limited, London, England, a British Company, and one-half to Wilkinson Sword Limited, London, England, a British company
Filed May 13, 1963, Ser. No. 280,028
Claims priority, application Great Britain, Oct. 7, 1960, 34,373/60
6 Claims. (Cl. 220—47)

This invention relates to electrical actuators and is a continuation-in-part of our application Serial No. 140,606 filed September 25, 1961, and now abandoned.

In accordance with the present invention there is provided in an electrical actuator for controlling the movement of a movable member, a glass member, said glass member engaging said movable member for preventing movement thereof, an electrical resistance wire positioned in close proximity to said glass member, said wire being of a material which when heated to a predetermined temperature by the passage of an electric current through said wire undergoes an exothermic reaction which raises it to a temperature greatly in excess of said predetermined temperature to fracture said glass member by thermal shock thereby freeing said movable member.

The invention also provides an electrical actuator adapted to prevent movement of a member prior to electrical energization of said actuator, comprising a glass tube, said tube engaging said member and restraining said member from moving, a wire mounted within said tube, said wire being composed of two metals which when heated to a predetermined temperature by the passage of electric current therethrough undergo an exothermic alloying reaction which raises the wire to a temperature, greatly in excess of said predetermined temperature, at which said tube is fractured thereby freeing said member.

The invention further provides an electrical actuator operable to open the discharge outlet of a pressure vessel, having a diaphragm normally sealing said discharge outlet, comprising a piston, said piston having a surface, a heat shatterable glass tube, said glass tube holding said piston surface in contact with said diaphragm, and an electrically heatable wire in the glass tube, said wire being composed of two metals which when heated to a predetermined temperature undergo an exothermic alloying reaction, the heat energy released by said alloying reaction shattering said glass tube.

According to another aspect of the invention there is provided an electrical actuator for opening the discharge outlet of a pressure vessel containing fluid at a predetermined pressure, said discharge outlet being sealed by a diaphragm having a bursting pressure less than said predetermined pressure, comprising a piston, said piston contacting said diaphragm, a heat shatterable glass member, said glass member engaging said piston for preventing movement of said piston by the pressure applied by said fluid to said diaphragm, and an electrically heatable wire located adjacent said glass member, said wire being of exothermic material, whereby heating said wire to a predetermined temperature produces an exothermic reaction, the heat from which shatters said glass member.

Figure 2:
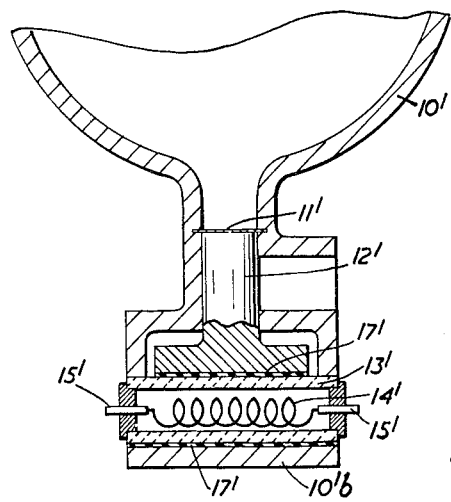

One form of actuator in accordance with the invention will now be described, by way of example only, with reference to the accompanying diagrammatic drawing, in which:

FIG. 1 is a sectional elevation of the discharge outlet end of a fire extinguisher, the contents of which are released by operation of this form of actuator; and FIG. 2 is a similar view to FIG. 1 of a modified construction of fire extinguisher, similar parts being similarly referenced.

Referring first to FIG. 1, the extingusher cylinder 10 is designed to contain compressed gas which when released effects discharge of a chemical fire-extinguishant powder or the cylinder 10 may contain a fire-extinguishant fluid together with a compressed gas for effecting ejection of the extinguishant fluid from the cylinder. The cylinder 10 is sealed by a burster disc or diaphragm 11 which is provided with a supporting piston 12 to enable it to resist the pressure in the cylinder 10, the disc or diaphragm 11 rupturing if the piston 12 is withdrawn.

The piston 12 is held against movement from the position in which it supports the diaphragm 11 by the actuator, the actuator being strong enough to resist the pressure on the diaphragm which exceeds its bursting pressure. In this form the actuator comprises a glass tube 13 containing a wire 14 the composition of which will be described below), the tube 13 passing through a hole in the stem 12a of the piston 12. An insulated lead-in connection 15 is provided at each end of the tube 13 so that the wire 14 can be connected to an operating current source (not shown). When a predetermined current is passed through the wire 14 an exothermic alloying reaction occurs in the wire 14 and the heat energy released is such as to couse shattering of the glass tube 13 due to thermal shock and also due to the pressure applied to the tube by the piston 12. Thus, electrical energization of the actuator removes the suuport given to the diaphragm 11 by the glass tube 13 through the medium of the piston 12 and, because the bursting pressure of the diaphragm 11 is less than the pressure within the cylinder 10, the diaphragm 11 is ruptured and the contents of the cylinder can escape through the discharge outlet 10a.

The wire 14 is so composed that when heated to a predetermined temperature, for example 650° C., the wire undergoes an exothermic reaction and the heat energy released far exceeds the energy of the electrical current passed through the wire. As a result the wire 14 reaches a considerably higher temperature, for example in excess of 2,000° C. At this latter temperature the wire disintegrates violently and peppers the glass tube 13 with small molten globules which increases the shock applied to the glass.

A preferred wire for thus purpose consists of two separate metals between which an exothermic alloying reaction takes place after the critical temperature (normally about 650° C.) has been reached resulting in the rapid release of considerable heat enrgy. One of the two separate metals may be aluminum or magnesium, the other of the two separate metals being either platinum or palladium, but any other metals may be used between which an exothermic alloying reaction will take place. In one form the wire may consist of an aluminum or magnesium core clad with a sheath of palladium or platinum; the metals may be present in equal proportions on a volumetric basis. Although the wire may be as small as 0.001 of an inch in diameter, conveniently it will be of substantially larger diameter.

One important advantage of the use of such wire is that the total heat energy released far exceeds the energy necessary to initiate the action. Another important advantage is that the reaction occurs satisfactorily in an inert atmosphere, in a vacuum or (when initiated by the passage of an electric current) under water. The presence of oxygen is not necessary for the reaction to occur.

The choice of material for the diaphragm 11 is determined by the nature of the contents of the cylinder 10 and upon the required bursting pressure and may, for example, be a ductile metal such as copper or rubber or synthetic plastic material.

Resilient seatings 16 may be provided for the glass tube 13 and resilient packing 17 may be provided between the surfaces of the piston stem 12a and the glass tube 13.

FIGURE 2 shows a piston 12' of alternative form to piston 12 of FIG. 1. The glass tube 13', resistance wire 14' and lead-in connections 15' are of identical construction to the corresponding members 13, 14 and 15 in FIG. 1. The tube 13' is supported along its whole length by resting on the base 10'b of the cylinder 10'. The larger diameter portion of piston 12' is supported by the tube 13' with interposed resilient packing 17'. When the glass tube 13' is shattered the piston 12' is free to move downwardly until stopped by engagement with base 10'b.

While the arrangements illustrated have the longitudinal axis of the actuator tube at right angles to the direction of movement of the piston, it is of course possible to have the axes at less acute angles and even parallel to one another; in the latter event the actuating tube can be either in compression or in tension prior to operation.

While described in respect of their application to the opening of a gas cylinder, it will be readily apparent that there are many other possible applications of actuators in accordance with the invention.

We claim:

1. In an electrical actuator for controlling the movement of a movable member, a glass member, said glass member engaging said movable member for preventing movement thereof, an electrical resistance wire positioned in close proximity to said glass member, said wire being of a material which when heated to a predetermined temperature by the passage of an electric current through said wire undergoes an exothermic reaction which raises it to a second temperature greatly in excess of said predetermined temperature, the intensity of said second temperature being sufficient in relation to the strength of the glass member as to fracture said glass member by thermal shock thereby freeing said movable member.

2. An electrical actuator adapted to prevent movement of a member prior to electrical energization of said actuator, comprising a glass tube, said tube engaging said member and restraining said member from moving, a wire mounted within said tube, said wire being composed of two metals which when heated to a predetermined temperature by the passage of electric current therethrough undergo an exothermic alloying reaction which raises the wire to a second temperature, greatly in excess of said predetermined temperature, the intensity of said second temperature being sufficient in relation to the strength of the glass tube as to fracture said tube thereby freeing said member.

3. An electrical actuator operable to open the discharge outlet of a pressure vessel, said pressure vessel having a diaphragm normally sealing said discharge outlet, said diaphragm having one face exposed to the pressure within said vessel, comprising a piston, said piston having a surface, a heat shatterable glass tube, said glass tube holding said piston surface in contact with the face of said diaphagm opposite said one face, and an electrically heatable wire in the glass tube, said wire being composed of two metals which when heated to a predetermined temperature undergo an exothermic alloying reaction, the heat energy released by said alloying reaction being sufficient in relation to the strength of the glass tube as to cause shattering of said glass tube.

4. An electrical actuator for opening the discharge outlet of a pressure vessel containing fluid at a predetermined pressure, said discharge outlet being sealed by a diaphragm having a bursting pressure less than said predetermined pressure, said diaphragm having one face exposed to the pressure within said vessel, comprising a piston, said piston contacting the face of said diaphragm opposite said one face, a heat shatterable glass member, said glass member engaging said piston for preventing movement of said piston by the pressure applied by said fluid to said diaphragm, and an electrically heatable wire located adjacent said glass member, said wire being of exothermic material, whereby heating said wire to a predetermined temperature produces an exothermic reaction the heat from which is sufficient in relation to the strength of the glass member as to shatter said glass member.

5. An actuator according to claim 4, wherein said wire is composed of a first metal and a second metal, said first metal being selected from the group comprising aluminium and magnesium and said second metal being selected from the group comprising platinum and palladium.

6. An actuator according to claim 5, wherein said first metal forms a core for said wire which core is clad with a sheath of said second metal.

References Cited by the Examiner

UNITED STATES PATENTS 2,926,566  3/60  Atkins _____ 89—28

FOREIGN PATENTS 772,673  4/57  Great Britain.

ISADOR WEIL, *Primary Examiner.*